(12) United States Patent
Shih et al.

(10) Patent No.: US 8,076,435 B2
(45) Date of Patent: Dec. 13, 2011

(54) ACRYLIC COPOLYMERS WITH HIGH HEAT-RESISTANCE AND PREPARATION THEREOF

(75) Inventors: Kuo-Chen Shih, Kaohsiung (TW); Mao-Lin Hsueh, Pingtung County (TW); Yi-Zhen Chen, Yilan County (TW)

(73) Assignee: Industrial Technology Research Institute, Hsinchu County (TW)

( * ) Notice: Subject to any disclaimer, the term of this patent is extended or adjusted under 35 U.S.C. 154(b) by 69 days.

(21) Appl. No.: 12/484,990

(22) Filed: Jun. 15, 2009

(65) Prior Publication Data
US 2010/0168355 A1   Jul. 1, 2010

(30) Foreign Application Priority Data

Dec. 31, 2008 (TW) ............................. 97151748 A
Apr. 6, 2009 (TW) ............................. 98111347 A

(51) Int. Cl.
*C08F 220/12* (2006.01)
(52) U.S. Cl. ............ 526/329.6; 526/266; 526/268; 526/328; 526/328.5; 526/329.3; 526/332
(58) Field of Classification Search ........ 526/329.6, 526/266, 268, 328, 328.5, 329.3, 332
See application file for complete search history.

(56) References Cited

U.S. PATENT DOCUMENTS 3,135,723 A   6/1964  Vandegaer
6,262,214 B1 *  7/2001  Yanagase et al. .......... 526/329.6

FOREIGN PATENT DOCUMENTS

| JP | 49-10156 A | 1/1974 |
|----|-----------|--------|
| JP | 58-5318 A | 1/1983 |
| JP | 58-13652 A | 1/1983 |
| JP | 61-64703 A | 4/1986 |
| JP | 61-95011 A | 5/1986 |
| JP | 63-30510 A | 2/1988 |
| JP | H10-298237 A | 11/1998 |

OTHER PUBLICATIONS

First examination opinion notification issued by the China Intellectual Property Office on Mar. 30, 2011,for the referenced application's counterpart application in China (Application No. 200910007983.0).

* cited by examiner

*Primary Examiner* — Robert D. Harlan
(74) *Attorney, Agent, or Firm* — Pai Patent & Trademark Law Firm; Chao-Chang David Pai

(57) ABSTRACT

An acrylic copolymer with high heat-resistance is provided. The acrylic copolymer includes repeat units of a monomer of Formula (1) and repeat units of a methacrylic monomer derivative:

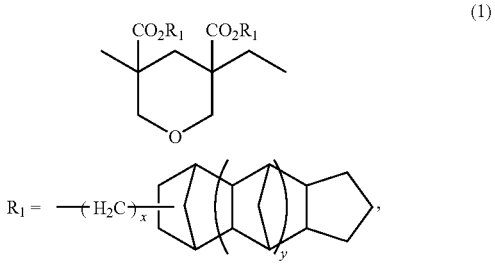

(1)

wherein x is 1-3 and y is 0-3. The acrylic copolymer possesses high heat-resistance and low water absorptivity. The invention also provides a method for preparing the acrylic copolymer.

8 Claims, No Drawings

ACRYLIC COPOLYMERS WITH HIGH HEAT-RESISTANCE AND PREPARATION THEREOF

CROSS REFERENCE TO RELATED APPLICATIONS

This Application claims priority of Taiwan Patent Application No. 97151748, filed on Dec. 31, 2008 and No. 98111347, filed on Apr. 6, 2009, the entirety of which is incorporated by reference herein.

BACKGROUND

1. Technical Field

The disclosure relates to acrylic copolymers with high heat-resistance and low water absorptivity.

2. Description of the Related Art

An optical acrylic polymer material can be widely used in various applications, such as light guiding plates (LGP), PDP front plates, optical diffusion plates or optical discs due to its high transparency, low birefringence, strong weather resistance and lower cost than other materials. Optical acrylic polymer materials, however, suffer from some drawbacks, such as low heat resistance and high water absorptivity. Thus, development of an improved acrylic polymer material is desirable.

Some methods for improving the heat resistance of PMMAs have been developed, for example, copolymerizing an MMA with an α-methylstyrene (U.S. Pat. No. 3,135,723), copolymerizing an MMA with a maleic anhydride (JP 49-10156), copolymerizing an MMA with a maleimide (JP 61-95011), crosslink-copolymerizing an MMA with a polyfunctional monomer (JP 63-30510) and copolymerizing a primary amine with a methacrylic resin to prepare a methacrylimide-containing polymer (JP 61-64703). Although the heat resistance thereof is improved, some drawbacks, such as slowing of the copolymerization rate, forming of color polymers and reduction in transparency still exist.

Meanwhile, some methods for reducing the water absorptivity thereof have been developed, for example, copolymerizing an MMA and a cyclohexyl methacrylate (JP 58-5318) and copolymerizing an MMA and a benzyl methacrylate (JP 58-13652). Although the water absorptivity thereof is reduced, heat resistance thereof is deteriorated. Thus, development of an optical polymer resin material with high thermal stability and low water absorptivity is desirable.

SUMMARY

One embodiment of the invention provides an acrylic copolymer with high heat-resistance comprising repeat units of a monomer of Formula (1) and repeat units of a methacrylic monomer derivative:

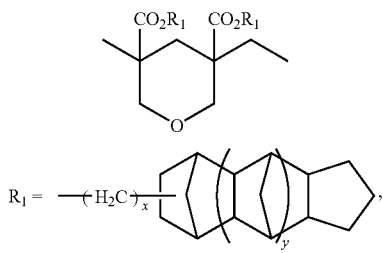

(1)

wherein
x is 1-3 and y is 0-3.

One embodiment of the invention provides a method for preparing an acrylic copolymer with high heat-resistance comprising copolymerizing an α-acrylic monomer derivative of Formula (2) and a methacrylic monomer derivative under a polymerization reaction initiator, wherein the polymerization reaction initiator is a peroxide having one or more O—O bonds:

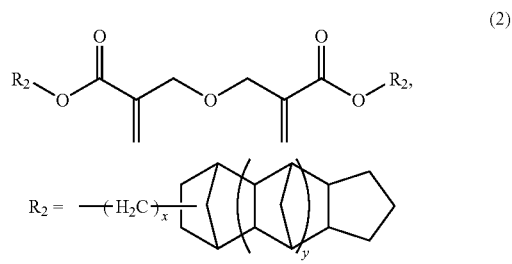

(2)

wherein
x is 1-3 and y is 0-3.

Another embodiment of the invention provides an acrylic copolymer with high heat-resistance comprising the repeat units of the monomer of Formula (1) and the repeat units of the methacrylic monomer derivative. The acrylic copolymer is prepared by copolymerizing an α-acrylic monomer derivative of Formula (2) and a methacrylic monomer derivative under a peroxide polymerization reaction initiator having one or more O—O bonds. During the acrylic copolymer preparation, the α-acrylic monomer derivative of Formula (2) is ringed to form a tetrahydrofuran structure via cyclopolymerization.

A detailed description is given in the following embodiments.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention provides an acrylic copolymer with high heat-resistance comprising repeat units of a monomer of Formula (1) and repeat units of a methacrylic monomer derivative:

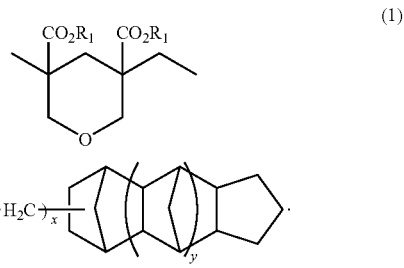

(1)

In Formula (1), x may be 1-3 and y may be 0-3.

The number average molecular weight (Mn) of the acrylic copolymer in one or more embodiments is in the range 5,000-1,000,000. In one or more embodiments, the number average molecular weight (Mn) of the acrylic copolymer is 50,000-1,000,000. In one or more embodiments, the number average molecular weight (Mn) of the acrylic copolymer is 50,000-500,000.

The methacrylic monomer derivative may have Formula (3):

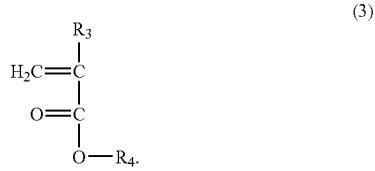

In Formula (3), $R_3$ may be hydrogen or methyl. $R_4$ may be C1-22 alkyl or C5-22 cycloalkyl. The methacrylic monomer derivative preferably comprises methyl methacrylate, ethyl methacrylate, benzyl methacrylate, cyclohexyl methacrylate or methyl acrylate.

In the acrylic copolymer with high heat-resistance, the repeat units of the monomer of Formula (1) and the repeat units of the methacrylic monomer derivative have a molar ratio of about 5-95%.

One embodiment of the invention provides a method for preparing an acrylic copolymer with high heat-resistance, comprising the following steps. An α-acrylic monomer derivative of Formula (2) and a methacrylic monomer derivative are copolymerized under a polymerization reaction initiator. The polymerization reaction initiator is a peroxide having one or more O—O bonds:

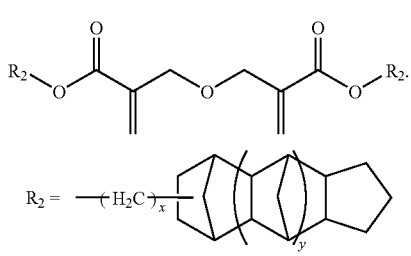

In Formula (2), x may be 1-3 and y may be 0-3.

The polymerization reaction initiator may be benzoyl peroxide (BPO), tert-butylperoxy-2-ethylhexanate (PBO), di-tert-butylperoxide (PBD), tert-butylperoxyisopropylcarbonate (PBI) or n-butyl-4,4-bis(tert-butylperoxy)valarate (PHV).

The methacrylic monomer derivative may have Formula (3):

In Formula (3), $R_3$ may be hydrogen or methyl. $R_4$ may be C1-22 alkyl or C5-22 cycloalkyl. The methacrylic monomer derivative preferably comprises methyl methacrylate, ethyl methacrylate, benzyl methacrylate, cyclohexyl methacrylate or methyl acrylate.

The molar ratio of the α-acrylic monomer derivative in one or more embodiments is in the range 95-5%. In one or more embodiments, the molar ratio of the α-acrylic monomer derivative is 30-85%. In one or more embodiments, the molar ratio of the α-acrylic monomer derivative is 40-85%.

The acrylic copolymer with high heat-resistance may be prepared by conventional polymerization methods, for example, cation polymerization, group transfer polymerization (GTP) or free-radical polymerization methods.

During free-radical polymerization, use of a polymerization reaction initiator having one or more O—O bonds is preferable, effectively improving yields. The polymerization reaction initiator has a weight ratio of 0.1-1 parts by weight, based on 100 parts by weight of the monomers.

In the foregoing polymerization methods, the solvent may comprise hydrocarbons such as toluene, xylene, benzene or hexane, halohydrocarbons such as chloroform, dichloromethane or carbon tetrachloride, tetrahydrofuran, dimethyl sulfoxide (DMSO), diethyl ether or the like.

The acrylic copolymer with high heat-resistance comprises the repeat units of the monomer of Formula (1) and the repeat units of the methacrylic monomer derivative. The acrylic copolymer is prepared by copolymerizing an α-acrylic monomer derivative of Formula (2) and a methacrylic monomer derivative under a peroxide polymerization reaction initiator having one or more O—O bonds. During the preparation of the acrylic copolymer, the α-acrylic monomer derivative of Formula (2) is ringed to form a tetrahydrofuran structure via cyclopolymerization.

In one embodiment, the molecular weight and molecular weight distribution of the acrylic copolymer were obtained by a GPC method (solvent: THF), with a calibration curve of polystyrene (PS). The glass transition temperature (Tg) thereof was measured by a DSC.

EXAMPLE 1

Preparation of an Acrylic Monomer (TCDHM)

First, 11.02 g of 8-hydroxymethyltricyclo[5.2.1.0$^{2,6}$]decanyl acrylate (HMTCDA) (50 mmol), 1.75×10$^{-2}$ g of hydroquinone (1.59×10$^{-4}$ mol), 1.50 g of paraformaldehyde (50 mmol), 0.75 g of 1,4-diazabicyclo[2.2.2]octane (DABCO) (6.63×10$^{-3}$ mol, white solid) and 3.83 mL of tert-butanol (40 mmol, colorless liquid) were mixed in a 100 mL reaction bottle to react for five days at 80° C. After removal of solvent, the resulting solution was purified by silicon gel column chromatography (eluent: n-hexane/ether=10:1). A 6.52 g colorless tricyclodecanyl-α-(hydroxymethyl)acrylate (TCDHM) liquid product was formed, with a yield of 54%.

EXAMPLE 2

Preparation of an Acrylic Copolymer (Mn=63,000)

First, 0.48 g of TCDHM (prepared by Example 1) (1 mmol), 0.96 mL of MMA (9 mmol), 5.67 mg of BPO (2.34×10$^{-2}$ mmol) and 2 mL of toluene were mixed in a 50 mL reaction bottle. Under nitrogen gas, the solution was heated to 80° C. and reacted for 1.5 hours. After the reaction was completed, 50 mL of methanol was added to precipitate large amounts of white solid. After filtration, the precipitate was dissolved by 10 mL of THF and re-precipitated by methanol (THF/methanol=1:6). After repeating the re-precipitation step for three times, the product was dried. A 1.19 g white solid product was formed, with a yield of 86%. The acrylic copolymer had a molecular weight of 63,000. The molecular weight distribution (PDI) was 1.84. The glass transition temperature (Tg) thereof was 114° C., as shown in Table 1.

EXAMPLE 3

Preparation of an Acrylic Copolymer (Mn=80,400)

First, 0.96 g of TCDHM (prepared by Example 1) (2 mmol), 0.85 mL of MMA (8 mmol), 5.67 mg of BPO (2.34×10$^{-2}$ mmol) and 2 mL of toluene were mixed in a 50 mL reaction bottle. Under nitrogen gas, the solution was heated to 80° C. and reacted for 1.5 hours. After the reaction was completed, 50 mL of methanol was added to precipitate large amounts of white solid. After filtration, the precipitate was dissolved by 10 mL of THF and re-precipitated by methanol (THF/methanol=1:6). After repeating the re-precipitation step for three times, the product was dried. A 1.58 g white solid product was formed, with a yield of 90%. The acrylic copolymer had a molecular weight of 80,400. The molecular weight distribution (PDI) was 1.73. The glass transition temperature (Tg) thereof was 125° C., as shown in Table 1.

COMPARATIVE EXAMPLE 1

Preparation of an Acrylic Copolymer (PMMA) (Mn=106, 300)

First, 1 g of MMA (10 mmol), 5.67 mg of BPO (2.34×10$^{-2}$ mmol) and 2 mL of toluene were mixed in a 50 mL reaction bottle. Under nitrogen gas, the solution was heated to 80° C. and reacted for 1.5 hours. After the reaction was completed, 50 mL of methanol was added to precipitate large amounts of white solid. After filtration, the precipitate was dissolved by 10 mL of THF and re-precipitated by methanol (THF/methanol=1:6). After repeating the re-precipitation step for three times, the product was dried. A 0.85 g white solid product was formed, with a yield of 85%. The acrylic copolymer (PMMA) had a molecular weight of 106,300. The molecular weight distribution (PDI) was 1.14. The glass transition temperature (Tg) thereof was 105° C., as shown in Table 1.

TABLE 1

| | Molar ratio (%) | | Molecular weight (Mn) | Molecular weight distribution (PDI) | Glass transition temperature (Tg) |
|---|---|---|---|---|---|
| | MMA | TCDHM | | | |
| Example 2 | 90 | 10 | 63,000 | 1.84 | 114 |
| Example 3 | 80 | 20 | 80,400 | 1.73 | 125 |
| Comparative Example 1 | 100 | 0 | 106,300 | 1.14 | 105 |

The results indicated that the acrylic copolymer (prepared by Examples 2-3) had a higher glass transition temperature (Tg) than that of the conventional PMMA acrylic copolymer (prepared by Comparative Example 1). That is, the PMMA-co-PTCDHM acrylic copolymer prepared by the invention had higher thermal stability than the conventional PMMA acrylic copolymer.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An acrylic copolymer with high heat-resistance comprising repeat units of a monomer of Formula (1) and repeat units of a methacrylic monomer derivative:

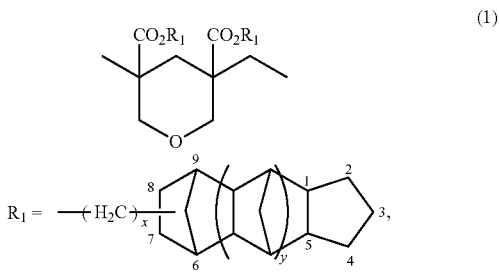

wherein x is 1-3 and y is 0-3 and —(CH$_2$)$_x$— is connected to C2, C3, C7 or C8 of a polycyclic moiety of R$_1$.

2. The acrylic copolymer with high heat-resistance as claimed in claim 1, wherein the acrylic copolymer has a number average molecular weight of 5,000-1,000,000.

3. The acrylic copolymer with high heat-resistance as claimed in claim 1, wherein the methacrylic monomer derivative has Formula (3):

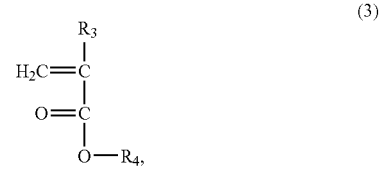

wherein

R$_3$ is hydrogen or methyl and R$_4$ is C1-22 alkyl or C5-22 cycloalkyl.

4. The acrylic copolymer with high heat-resistance as claimed in claim 1, wherein the repeat units of the monomer of Formula (1) and the repeat units of the methacrylic monomer derivative have a molar ratio of 5-95%.

5. A method for preparing an acrylic copolymer with high heat-resistance of claim 1, the method comprising copolymerizing an a-acrylic monomer derivative of Formula (2) and a methacrylic monomer derivative under a polymerization reaction initiator, wherein the polymerization reaction initiator is a peroxide having one or more O—O bonds:

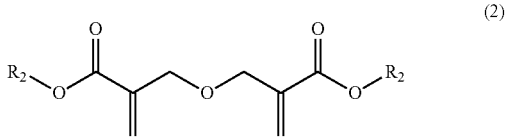

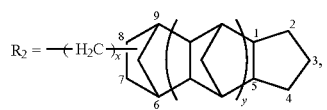

wherein x is 1-3 and y is 0-3, and —(CH$_2$)$_x$— is connected to C2, C3, C7 or C8 of a polycyclic moiety of R$_2$.

6. The method for preparing an acrylic copolymer with high heat- resistance as claimed in claim 5, wherein the polymerization reaction initiator is benzoyl peroxide (BPO), tert-butylperoxy-2-ethylhexanate (PBO), di-tert-butylperoxide (PBD), tert-butylperoxyisopropylcarbonate (PBI) or n-butyl-4,4-bis(tert-butylperoxy)valarate (PHV).

7. The method for preparing an acrylic copolymer with high heat-resistance as claimed in claim 5, wherein the methacrylic monomer derivative has Formula (3):

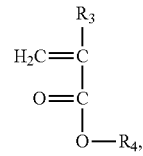

(3)

wherein

R$_3$ is hydrogen or methyl and R$_4$ is C1-22 alkyl or C5-22 cycloalkyl.

8. The method for preparing an acrylic copolymer with high heat-resistance as claimed in claim 5, wherein the α-acrylic monomer derivative has a molar ratio of 95-5%.

* * * * *